Sept. 1, 1959  G. A. LYON  2,902,387
WHEEL COVER
Filed Sept. 3, 1954  4 Sheets-Sheet 3
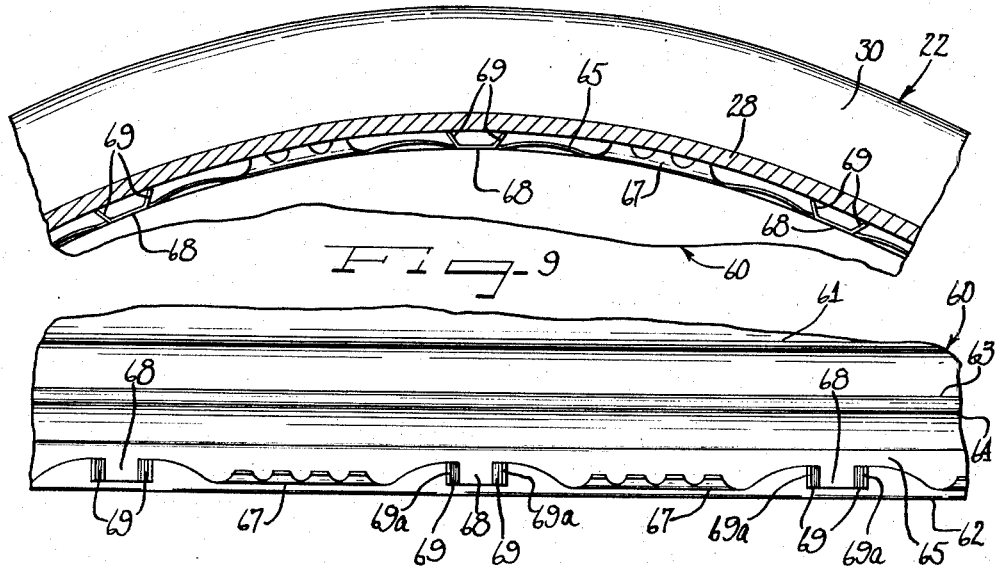
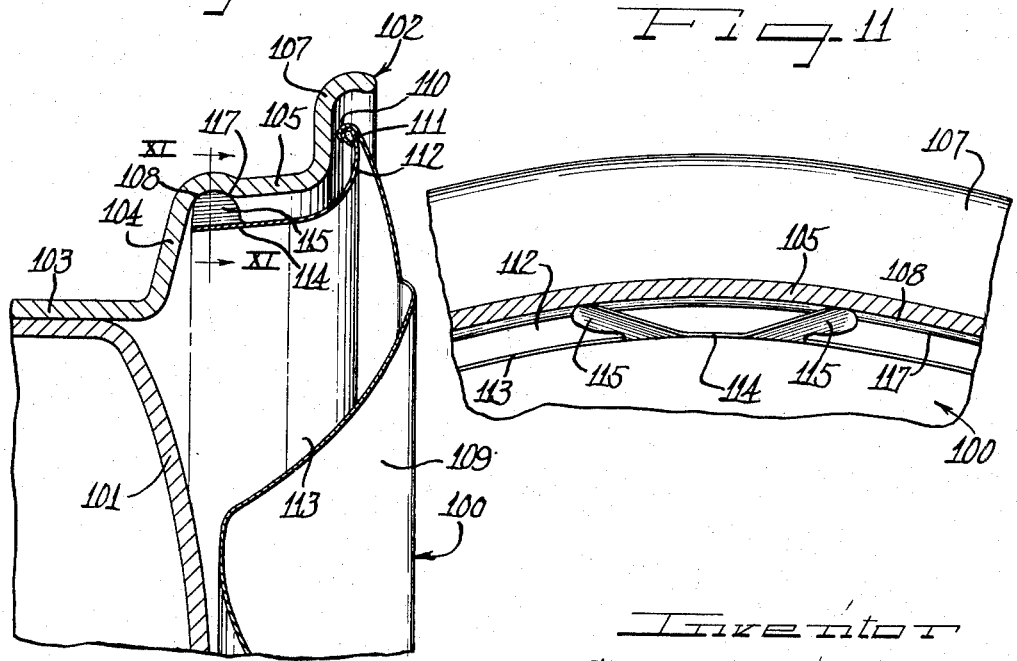
Inventor
George Albert Lyon
By Hill, Sherman, Meroni, Gross & Simpson Attys

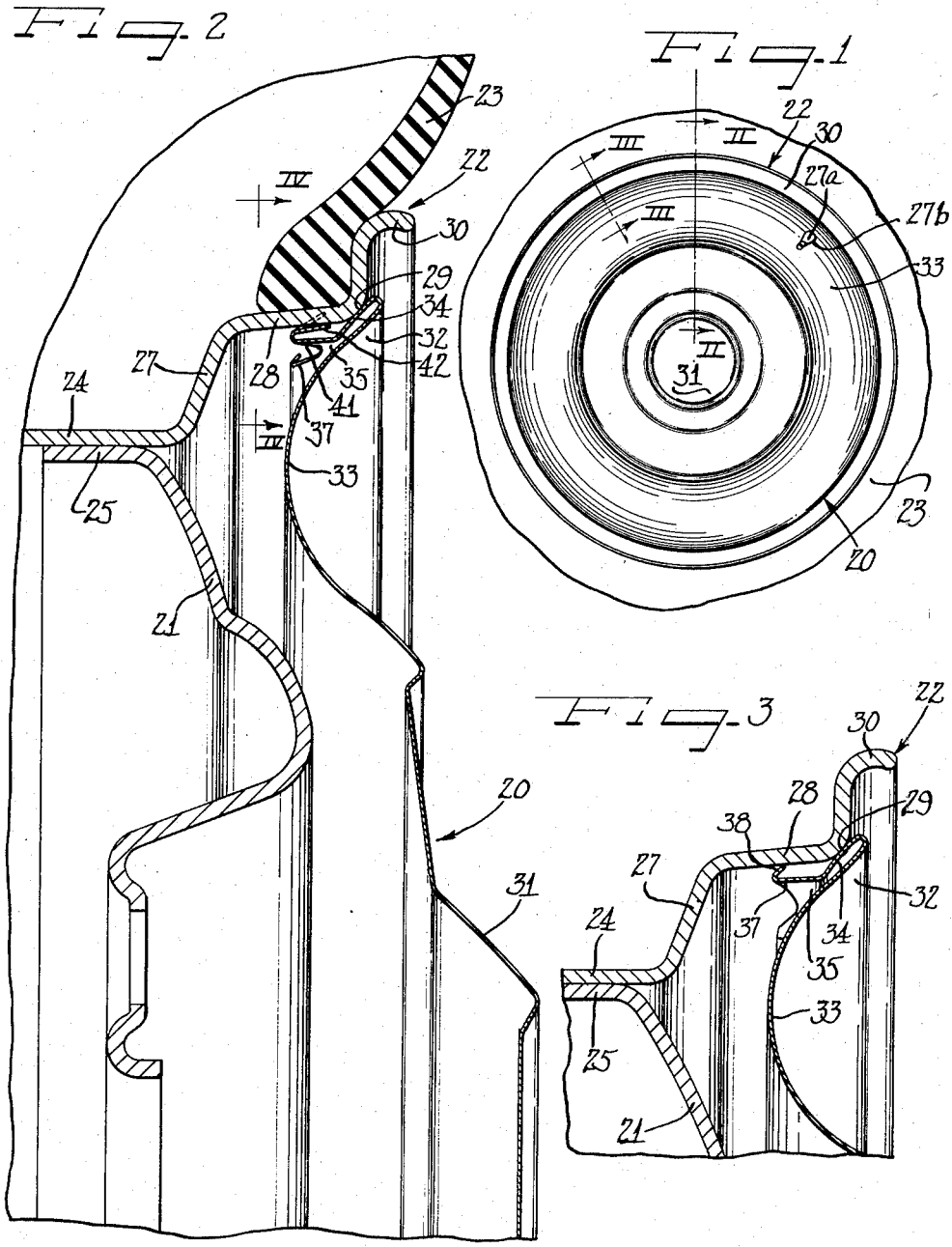

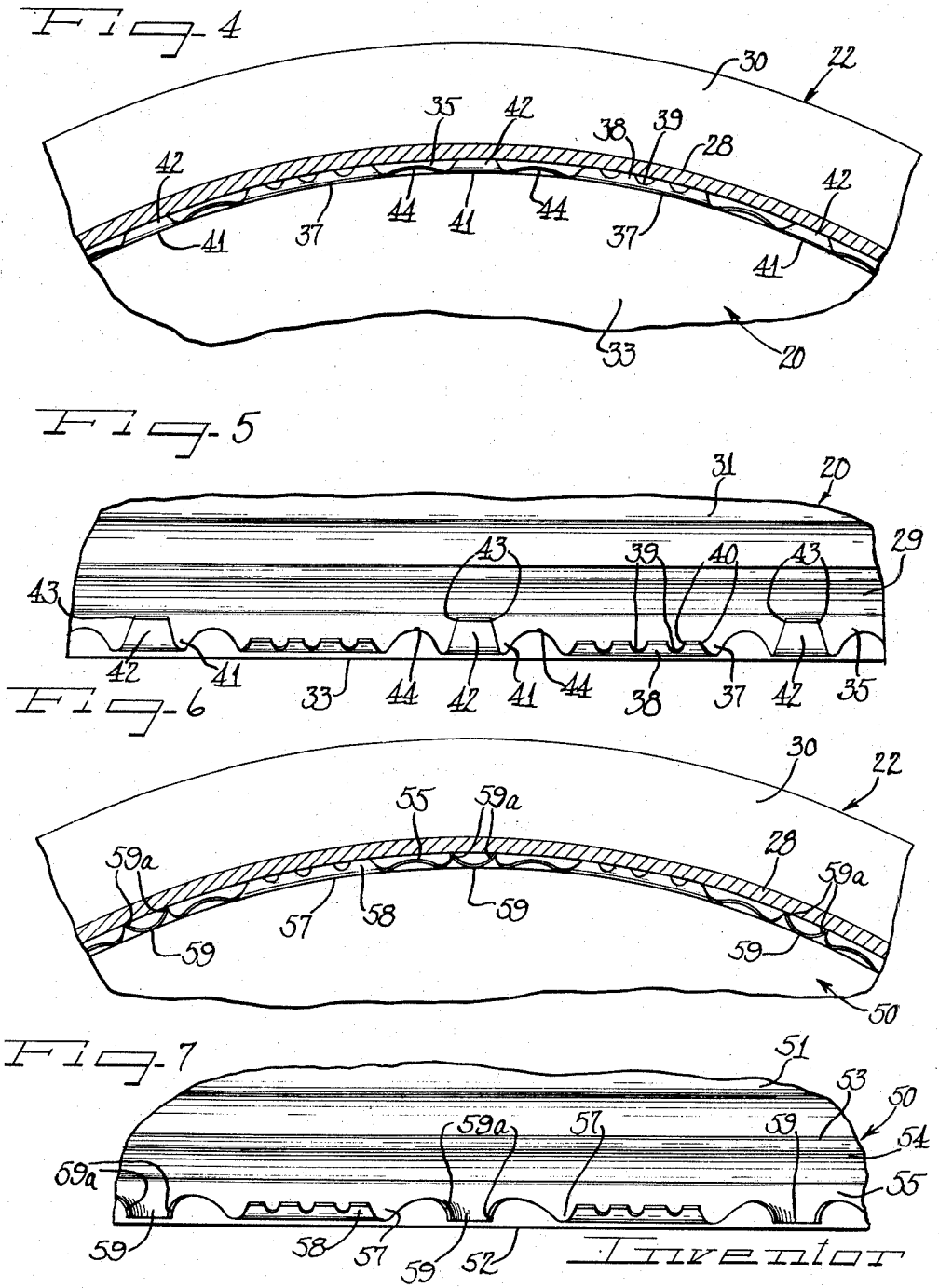

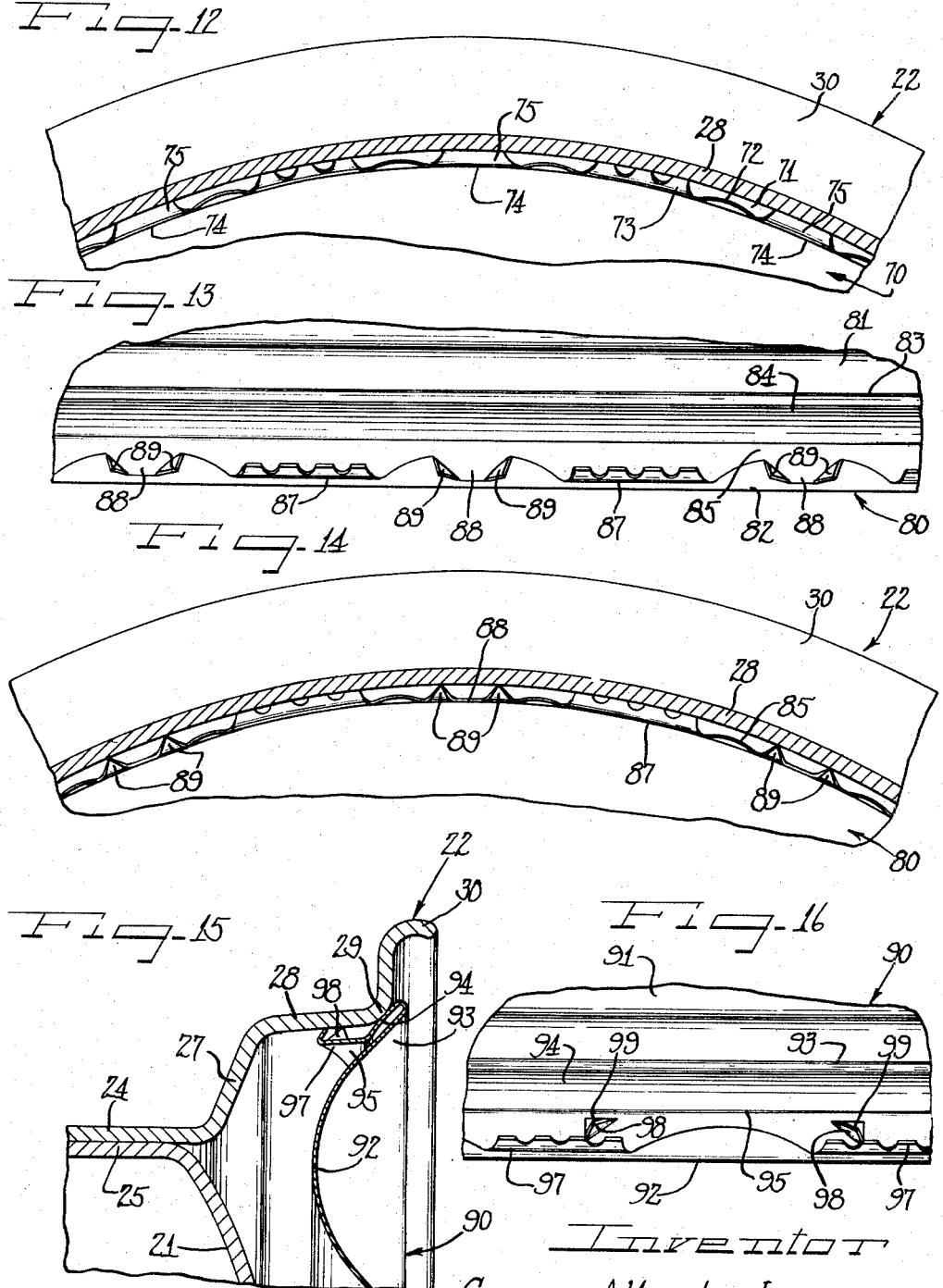

United States Patent Office 2,902,387
Patented Sept. 1, 1959

2,902,387

WHEEL COVER

George Albert Lyon, Detroit, Mich.

Application September 3, 1954, Serial No. 454,144

6 Claims. (Cl. 301—37)

The present invention relates to improvements in the ornamental and protective covering of the outer sides of vehicle wheels and more particularly concerns novel cover structures for such wheels.

An important object of the present invention is to provide improved wheel structures including covers having novel means for retaining the same on the wheels.

Another object of the invention is to provide in wheel covers improved combination retaining and turn-preventing means.

A further object of the invention is to provide novel means in wheel covers of the all over or full-disk type for retaining the covers against turning on the wheel.

Still another object of the invention is to provide wheel covers of the self-retaining type with turn-preventing means especially useful on wheels adapted for use with tubeless tires.

Other objects, features and advantages of the present invention will be readily apparent from the following detailed description of certain preferred embodiments taken in conjunction with the accompanying drawings in which:

Figure 1 is an outer side or elevational view of a vehicle wheel embodying features of the invention;

Figure 2 is an enlarged fragmentary radial sectional view taken substantially along the line II—II of Figure 1;

Figure 3 is a fragmentary radial sectional view taken substantially on the line III—III of Figure 1;

Figure 4 is a fragmentary sectional detail view taken substantially on the line IV—IV of Figure 2;

Figure 5 is a fragmentary edge elevational view of the cover of Figures 1 through 4;

Figure 6 is a fragmentary sectional view similar to Figure 4 but showing a modification;

Figure 7 is a fragmentary edge elevational view of the cover of Figure 6;

Figure 8 is a fragmentary sectional detail view similar to Figure 4 but showing a further modification;

Figure 9 is an edge elevational view of the cover of Figure 8;

Figure 10 is a fragmentary radial sectional view through a wheel and cover assembly showing further modification;

Figure 11 is a fragmentary detail sectional view taken substantially on the line XI—XI of Figure 10;

Figure 12 is a fragmentary sectional detail view similar to Figure 4 but showing still another modification.

Figure 13 is a fragmentary edge elevational view of a cover having yet another modification;

Figure 14 is a fragmentary sectional detail view substantially like Figure 12 but showing the modified cover of Figure 13;

Figure 15 is a fragmentary radial sectional view through a wheel end cover assembly in which yet another modification is shown; and, Figure 16 is an edge elevational view of the cover of Figure 15.

Heretofore bumps have been provided on the vehicle wheel tire rim for cooperation with a portion of a wheel cover for restraining the cover against torque imposed turning or rotation of the cover on the wheel. With a tire and tube assembly the pressing of such bumps in the tire rim has been permissible since any fracturing of the material of the tire rim in producing the bumps has been immaterial.

However, with the advent of the tubeless tire and the rapidly increasing adoption of such tubeless tires, it is desirable that the tire rim be free from embossments or pressed bumps so as to avoid any cracks or fractures through which air may leak or escape from within the tire. Nevertheless, the desirability of retaining the wheel covers against turning on the wheel and thus against distortion of valve stems projecting therethrough, persists and it is still desirable to provide means to prevent turning of the covers.

According to the present invention, as shown by way of example in Figures 1 through 5, a wheel cover 20 is constructed and arranged to be applied in press-on pry-off relation to the outer side of a wheel including a wheel body 21 and a tire rim 22 arranged to support a tubeless tire 23.

The tire rim 22 is provided with a base flange 24 to which is attached an attachment flange 25 of the wheel body 21. A side flange 27 extends generally radially outwardly from the outer edge of the tire rim base flange 24 and merges with a generally axially outwardly and radially outwardly sloping intermediate flange 28 joined at a shoulder 29 with a generally radially outwardly and then axially outwardly extending terminal flange 30.

By preference the wheel cover 20 is made from a piece of sheet metal such as stainless steel or brass stamped or drawn to shape with a central crown portion 31 for overlying the wheel body 21, and a marginal annular portion 32 joined to the crown portion by an annular radially dished or channel-like intermediate portion 33 adapted in the assembly with the wheel to overlie the side flange 27 of the tire rim and the juncture of the tire rim and wheel body. The radial extent of the cover marginal portion 32 is such as to overlie the outer side of the tire rim 22 and more particularly the shoulder 29.

For retaining the cover 20 on the wheel in snap-on pry-off relation, the cover is provided with marginal means for retainingly engaging with the tire rim. To this end, the marginal portion 32 of the cover has an underturned generally radially and axially inwardly annular flange 34 from which extends a generally axially inwardly directed annular portion 35 having thereon means for retainingly engaging with the tire rim. Herein such retaining means comprises a series of generally axially inwardly directed retaining fingers 37 provided with short and stiff axially and radially outwardly oblique finger terminals 38 arranged for retaining and gripping engagement with the intermediate flange 28 of the tire rim in the manner covered in my issued Patent No. 2,624,634, dated January 6, 1953.

The retaining fingers 37 are disposed on a diameter which is slightly less than the inside diameter of the intermediate flange 28 of the tire rim and the retaining finger terminals are normally disposed at their tips at a slightly greater diameter than the inside diameter of at least the intermediate portion of the intermediate flange 28. As a result, when the cover 28 is pressed axially inwardly into position onto the wheel, the retaining terminals 38 at their tips cam inwardly along the interface of the intermediate flange 28 and thereby the retaining fingers 37 are placed under radially inwardly deflected resilient tension under substantially uniform resilient resistance entirely around the perimeter of the wheel cover by virtue of the cooperation of the axially extending flange portion 35 and the underturned flange 34, whereby to afford substantial radially outward resilient, gripping thrust of the terminal flange tips of the fingers against the tire rim flange.

As best seen in Figs. 4 and 5, the retaining finger terminal flange portions 38 are notched out at intervals as shown at 39 so as to afford a plurality of corners or spurs 40 on each of the retaining fingers tending to bite into the surface of the intermediate flange 28 and thereby resist turning of the wheel cover on the wheel. However, due to high speeds of operation and therefore great torque stresses in operation of the wheel in service, there may at least under certain conditions, be a tendency for the wheel cover to turn or creep rotationally on the wheel and thereby distort and in extreme cases possibly shear a valve stem 27a projecting from the tire rim 22 through a suitable valve stem opening 27b in the intermediate portion 33 of the cover (Fig. 1). It should be understood of course, that with retaining fingers having the notched retaining terminals as shown the problem is not acute, but since such relative rotation of the cover and the wheel is a possibility, some users of covers, and more particularly automobile manufacturers who apply the covers to the wheels of their automobiles, demand some safety expedient against such turning. Herein this is accomplished in one form by providing between the cover retaining fingers 37 respective generally axially inwardly directed finger extensions 41 from the edge of the flange portion 35 and having elongated reversely generally axially and radially outwardly oblique elongated rim-engaging resilient terminal portion flanges 42 arranged to act resiliently radially outwardly against the intermediate flange 28. Normally the flexible finger terminal portions 42 extend to a substantially greater diameter than the inside diameter of the tire rim intermediate flange 28, as indicated in dash outline in Fig. 2. Upon pressing the cover axially inwardly, the terminal portions 42 are compressed or deflected to the diameter of the engaged inner face of the intermediate flange 28 and are thus placed under substantial resilient tension causing the fingers to thrust or shoulder at their tips, not end-wise, but with the radially outer sides of the tips bearing generally face-to-face against the intermediate flange and approaching the same at a convergent angle. Thereby, corners 43 act as spurs to dig into the circumferentially arcuate surface of the tire rim intermediate flange 28 substantially as shown in Fig. 4. By having the fingers 41 with their terminal portions 42 disposed uniformly about the cover margin, anchorage against turning of the cover is firmly effected by reason of the multiplicity of points at which the plurality of finger terminal portions 42 engage the tire rim.

Since the anti-turn fingers 41 are relatively more resiliently deflectable than the retaining fingers 37, and are separated from the retaining fingers by substantial cut outs 44 in the axial flange portion 35, there is no tensioning strain or interference with proper cover retaining functioning of the retaining fingers 37 and the short and stiff terminals 38. Furthermore, since the anti-turn finger terminal portions 42 are of substantial length and in the assembly of the cover with the wheel engaging the terminal flange 28 axially inwardly adjacent to the tire rim shoulder 29, the tip spurs 43 enter into anchoring engagement with the terminal flange in the last increment of axially inward movement of the cover and by the same token only short axially outward movement is required to release the tips of the terminal portions 42 from the tire rim in prying the cover from the wheel. That is, the tips of the anti-turn finger terminal portions 42 become effective substantially after the retaining terminals 38 of the retaining fingers engage the intermediate flange 28, and the terminal portions 42 leave their effective engagement with the intermediate flange 28 in the initial phase of pry-off of the cover from the wheel. Thus, the anti-turn finger terminal portions 42 do not interfere with normal press-on pry-off of the cover 20, but once the cover is fully on the wheel with the outwardly turned flange 34 bearing against the shoulder 29, the terminal portions 42 serve effectively as turn preventing means for the cover.

In addition, the fingers 41 serve as cushioning means against severe radial shocks or forces acting on the cover and perhaps tending to impose unusual strain or stress upon the retaining fingers 37. In other words, the anti-turn fingers 41 and the terminal portions 42 cooperate with the retaining fingers 37 as auxiliary buffers or shock absorbers.

It should also be noted that the turn-preventing and cushioning fingers 41 are provided with progressively tapering sides toward their tips from curvate juncture with the flange 35 in the recesses or cut-outs 44. Thereby the fingers 41 are of greatest resilience or stiffness at juncture with the flange 35 and become progressively less stiff in resilient action toward their tips. This assures efficient resilient tensioning and thereby thrust of the tip portions of the finger terminal portions 42 against the tire rim flange.

In a modified construction as shown in Figs. 6 and 7 a cover 50 which may be substantially like the cover 20 is arranged for application to a vehicle wheel which may be in essential respects the same as the wheel of Figures 1 and 2 and accordingly, similar reference numerals have been applied thereto. In this form of the invention the cover 50 has a central crown portion 51, an intermediate dished annular portion 52, a marginal generally radially and axially outwardly directed annular portion 53 provided with an underturned flange 54 having a generally axially inwardly directed annular portion 55 from which extends a series of spaced cover retaining fingers 57 having short and stiff generally radially and axially outwardly directed oblique retaining terminal flanges 58 and in structure and operation corresponding to the fingers 37 of the cover 20.

Intermediate the cover retaining fingers 57 is provided a series of generally axially directed turn preventing extensions 59 from the axially extending flange portion 55. Preferably the turn-preventing fingers or extensions 59 are of approximately the same length or slightly shorter than the retaining fingers 57, and are of progressively narrower, or tapering dimension from their juncture on curvate flare with the flange 55. At their longitudinal margins the fingers 59 are turned generally radially outwardly into divergent relation to provide turn-preventing corners or spurs 59a which normally extend to at least a slightly greater diameter than the diameter of the annular portion of the intermediate flange 28 of the tire rim to be engaged thereby. As a result, when the cover 50 is pressed into retained position on the wheel, the turn preventing spurs 59a engage the inner face of the tire rim flange 28 in substantially anchoring relation against turning of the cover on the wheel in either rotary direction. In addition, of course, the fingers 59 cooperate with the retaining fingers 57 in cushioning the cover against transverse or generally radial shocks and forces.

In the modification of Figures 8 and 9, a cover 60 is arranged to be applied in press-on pry-off relation to a wheel substantially the same as the wheel of Figures 1 and 2, and embodies turn-preventing means modified from that described in connection with the cover 50 of Figures 6 and 7. To this end, the cover 60 comprises a crown portion 61, an intermediate annular portion 62, an outer annular marginal portion 63 having an underturned flange 64 provided with a generally axially inwardly directed annular flange portion 65. A series of cover retaining fingers 67 constructed the same as and functioning the same as the retaining fingers 37 and 57 previously described, are provided as extensions from the edge of the flange portion 65 and are retainingly engageable with the intermediate flange 28 of the tire rim. Intermediate the retaining fingers 67 is provided an alternating series of turn-preventing fingers 68 extending as extensions from the edge of the flange 65 in the recesses or cut-outs between the retaining fingers 67. Preferably the fingers 68 are approximately as long as or possibly a little shorter than the retaining fingers 67 and have along their longitudinal margins generally radially outwardly obliquely oppositely angled tire rim flange engaging wing flanges 69 providing edges 69a which extend normally to a greater diameter than the ultimately engaged diameter of the inner face of the tire rim intermediate flange 28. Thereby, as the cover 60 is pressed home on the wheel, the turn-preventing flange edges 69a enter into biting anchoring relation to the opposing face of the tire rim flange and thus effectively prevent turning of the cover on the wheel.

Having reference, now, to Figure 12, a modified cover 70 is provided which in all essential respects is the same as the cover 20 of Figures 1 and 2, and portions of the cover 70 not illustrated will be understood to be the same as portions of the cover 20. An underturned marginal flange 71 on the cover 70 is engageable with the shoulder at juncture of the intermediate flange 28 with the terminal flange 30 of the tire rim 22 and has a generally axially extending flange portion 72 from which extends a series of generally axially inwardly directed retaining fingers 73 which are in structure and function substantially identical with the retaining fingers 37 of the cover 20, but in this instance are somewhat narrower in the retaining terminal flange or retaining tip portions thereof. Therefore, there is slightly less turn-preventing capability of the tips of the retaining fingers 73 and accordingly, turn-preventing fingers 74 are provided having tire rim flange engaging leg portions which are substantially wider than the turn preventing fingers 41 of the cover 20 and are thus substantially stiffer in their resilient characteristics than the fingers 41 so as to enable the retaining tip corners to bite with greater force or resilient thrust into the opposing surface of the tire rim flange 28 to compensate for the less efficient turn preventing action of the retaining fingers 73.

In the modification of Figures 13 and 14, a construction is disclosed which may be considered an alternative form or modification of the cover 50 of Figures 6 and 7. To this end, a cover 80 is provided which in essential respects is similar to the cover 20 and is arranged to be applied in press-on pry-off relation to a vehicle wheel having the same construction as the wheel of Figures 1 and 2. To this end the cover 80 comprises a crown portion 81 having an intermediate annular dished portion 82 from which extends generally radially and axially outwardly an annular marginal portion 83 having an underturned marginal flange 84 provided with a generally axially inwardly directed flange portion 85 arranged to be disposed in radially inwardly spaced relation to the tire rim intermediate flange 28 in assembly of the cover with the wheel. Extending generally axially inwardly from the edge of the flange portion 85 is a series of cover retaining fingers 87 having the same construction and characteristics as the retaining fingers 37 of Figure 3.

Intermediate the retaining fingers 87 is provided an alternating series of axially inwardly directed turn-preventing resilient fingers 88 as extensions from the flange portion 85. Each of the fingers 88 is provided with a pair of generally oppositely obliquely generally radially outwardly and axially inwardly angled spurs or pointed ears 89 the tips of which normally extend slightly radially outwardly to a larger diameter than the diameter of that portion of the intermediate flange 28 of the tire rim to be engaged thereby in full assembly of the cover with the wheel. Accordingly, after the cover is pressed home on the wheel, the spur ears 89 which are angled from the bodies of the fingers 88 engage in biting, anchoring relation into the surface of the intermediate flange 28 and thus efficiently restrain turning of the cover on the wheel in service.

Having reference now to Figures 15 and 16, a modified wheel cover 90 is shown arranged to be applied to a vehicle wheel substantially identical and thus similarly referenced as the wheel of Figures 1 and 2, and the cover 90 is in most respects the same as the cover 20. To this end the cover 90 has a central crown portion 91 with an intermediate annular dished portion 92 disposed between the crown portion and an annular generally radially and axially outwardly directed marginal flange 93 from which extends an underturned reinforcing and retaining flange 94 having a generally axially inwardly directed annular terminal portion 95 arranged in assembly with the wheel to lie radially inwardly spaced from the terminal flange 28 of the tire rim adjacent the juncture 29. Extending generally axially inwardly from the flange portion 95 is a series of cover retaining fingers 97 which in essential respects are the same as the retaining fingers 37 of the form of Figures 2 and 3.

For supplementing the turn resistance of the retaining fingers 97, the flange portion 95 is provided at spaced interval with tire rim flange engaging turn-preventing means in this instance comprising struck out generally radially outwardly directed angular, oblique, spurs 98 having points 99 which normally project to a slightly greater diameter than the engaged diameter of the intermediate flange 28 of the tire rim. There is sufficient inherent resilience in the spurs 98 to accommodate the compression or resilient radial inward deflection incident to pressing the cover 90 into position on the wheel. By having the spurs 98 partially extending into the body portions of the fingers 97, resilient inward deflection of the finger bodies incident to engagement of the retaining fingers with the intermediate flange 28 also draws the spurs 98 radially inwardly and thus relieves resistance by the spurs to axially inward pushing of the wheel cover into position on the wheel. In the assembled relationship of the cover with the wheel the spurs 98 of which the tips 99 are directed in respectively opposite rotary directions bite or dig into the surface of the intermediate flange 28 of the tire rim and thus efficiently resist turning of the cover on the wheel. Furthermore, by the particular construction and relationship of the spurs 98 to the retaining fingers 97, the spurs 98 tend to supplement the cover retaining function of the retaining fingers to retain the cover against axial displacement from the wheel. It will be appreciated that the spurs 98 may be provided at such intervals as preferred in the flange 95. In some instances a pair of the spurs directed oppositely as shown in Figure 16 may be sufficient and in other instances additional pairs of the spurs may be provided, or one of the spurs 98 may be provided at each of the retaining fingers 97.

In Figures 10 and 11 is shown a modified cover 100 on which are provided combination cover retaining and turn-preventing means. In the present instance, the cover 100 is adapted to be applied to the outer side of a wheel having a wheel body 101 and a tire rim 102 provided with a base flange 103 to which the wheel body is attached. From the base flange 103 extends generally radially outwardly and sloping axially outwardly a side flange 104 merging with a generally axially outwardly and slightly radially outwardly oblique intermediate flange 105 from which extends a generally radially outwardly and then axially outwardly direct terminal flange 107. At juncture of the side flange 104 with the intermediate flange is provided a generally radially inwardly opening annular groove 108.

Although the cover 100 may be stamped or drawn in one piece of sheet metal such as stainless steel or brass or the like, similarly as the covers described hereinabove, the cover 100 is herein shown as comprising a body plate 109 of a diameter to overlie the outer side of the wheel including the wheel body 101 and the tire rim 102 and having at its radially outer edge an underturned bead-like flange 110 which is locked about a bead-like turned edge flange 111 of a cover retaining ring member 112 which is adapted to be rolled or otherwise formed from, if preferred, a different material than the plate 109. From juncture with the outer margin of the cover plate 109, the retaining ring member 112 extends generally radially inwardly in spaced relation to the terminal flange 107 and then extends axially inwardly to provide a terminal flange portion 113 which lies in radially inwardly spaced relation in assembly from the axially outer portion of the intermediate flange 105.

At predetermined spaced intervals, the flange portion 113 has axially inwardly directed retaining finger extensions 114 of a length to extend close to the side flange 104 in assembly and provided with respective pairs of cover retaining projections or wings 115 adapted to snap into retaining engagement within the groove 108 behind a generally axially and radially inwardly facing shoulder 117 at the axially outer side of the groove. Herein the retaining finger wings 115 are preferably of lobe-like form, that is of generally arcuate edge form substantially complementary to the cross sectional shape of the groove 108 so as to engage firmly within the groove and thus support the cover in spaced relation to all portions of the wheel including the wheel body 101 and the tire rim 102 except for the engagement of the retaining finger wing portions with the tire rim. Each of the retaining finger wings 115 is of substantial length in a circumferential direction and is tilted obliquely not only to the periphery of the cover but also to the axis of the cover in a manner to facilitate camming of the wings 115 from a greater diameter than the inside of the intermediate flange 105, including the inside diameter of the groove 108, into the tensioned, radially inwardly resiliently deflected condition thereof as shown in the assembled relationship within the groove 108. Having the tilted, oblique, angular relationship of the retaining finger wing portions 115 generally axially inwardly as well as radially outwardly in both longitudinal and transverse directions, the axially outer portions of the tips of the wing extensions 115 are cammingly tilted in relation to the shoulder 117 so as to facilitate pry-off camming of the retaining wing portions past the shoulder 117 by resilient radially inward deflection of the tips of the wings past the shoulder onto the inner surface of the intermediate flange 105 axially outwardly from the shoulder. Thence, of course, axially outward sliding of the finger wings 115 is a simple matter.

In addition to serving as effective cover retaining finger structure, the retaining wings 115 serve effectively as turn-preventing means by reason of the edges of the tips thereof being angled sharply into the groove 108. Since the retaining wings 115 are angled in opposite peripheral directions, it will be appreciated that the cover will be held against turning in either opposite direction.

In all forms of the cover described herein, the cover is adapted to be easily applied to the wheel by pushing the cover axially inwardly into position on the wheel. In all forms of the cover retaining finger means are provided for retaining the cover against intentional axial displacement on the wheel. In all forms of the cover, moreover, means are provided in association with the cover retaining means for retaining the cover against turning on the wheel. Such turn-preventing means require no special bumps or other projections or protuberances on the wheel itself but rely upon edge engagement of projecting structure on the cover itself cooperating with a surface of the wheel to restrain turning of the cover on the wheel.

It will be understood that modifications and variations may be effected without departing from the scope of the novel concepts of the present invention.

I claim as my invention:

1. In a wheel structure including a tire rim having a radially inwardly facing annular flange which is substantially smooth surfaced, a cover for disposition over the outer side of the wheel comprising a circular cover member having a marginal portion for overlying the tire rim and provided therebehind with a generally axially inwardly extending annular flange for telescoped disposition within the axially outer portion of said rim flange, said cover flange having a circumferential series of spaced cover retaining fingers retainingly engaging said rim flange, said cover flange having integrally in one piece therewith and disposed uniformly between said fingers a circumferential series of combination cushioning and turn-preventing fingers provided with terminal portions substantially narrower than the retaining fingers and with angled generally radially outwardly projecting edge portions bitingly engaging said rim flange to hold the cover against turning, said series of cushioning and turn-preventing fingers resisting radial displacement of the cover and thus preventing road shock damage to the retaining fingers.

2. In a wheel structure as defined in claim 1, said cushioning and turn-preventing fingers having the terminal portions turned in generally return-bent relation at the radially outer side of such fingers and with said edge portions located substantially axially outwardly relative to the cover retaining fingers.

3. In a wheel structure as defined in claim 1, said edge portions being bent from the circumferential sides of the cushioning and turn-preventing fingers.

4. In a wheel structure as defined in claim 1, said edge portions comprising wing flanges angled from the sides of the cushioning and turn-preventing fingers.

5. In a wheel structure according to claim 1, said edge portions being in the form of corner spurs angled from the terminal portions of the cushioning and turn-preventing fingers.

6. A cover for disposition over the outer side of a wheel including a tire rim having a radially inwardly facing annular flange which is substantially smooth surfaced, the cover comprising a circular member having a marginal portion adapted to overlie a tire rim and provided therebehind with a generally axially inwardly extending annular flange for telescoped disposition within the axially outer portion of a radially inwardly facing rim flange, said cover flange having a circumferential series of spaced cover retaining fingers retainingly engageable with such a rim flange, said cover flange having integrally in one piece therewith and disposed uniformly between said fingers a circumferential series of combination cushioning and turn-preventing fingers provided with terminal portions substantially narrower than the retaining fingers and with angled generally radially outwardly projecting edge portions bitingly engageable with a rim flange to hold the cover against turning, said series of cushioning and turn-preventing fingers being constructed and arranged relative to the retaining fingers to resist radial displacement of the cover and thus prevent road shock damage to the retaining fingers.

References Cited in the file of this patent

UNITED STATES PATENTS

| Re. 19,467 | Lyon | Feb. 12, 1935 |
| 1,800,173 | Anderson | Apr. 7, 1931 |
| 1,953,634 | Reichenbach | Apr. 3, 1934 |
| 2,607,632 | Lyon | Aug. 19, 1952 |
| 2,624,636 | Lyon | Jan. 6, 1953 |
| 2,732,262 | Buerger | Jan. 24, 1956 |
| 2,785,777 | Horn | Mar. 19, 1957 |
| 2,804,346 | Landell | Aug. 27, 1957 |
| 2,815,986 | Landell | Dec. 10, 1957 |

FOREIGN PATENTS

| 374,096 | Italy | Aug. 14, 1939 |